Jan. 15, 1963  F. T. SHERK  3,073,877
DEFLUORINATION OF HF ALKYLATION REACTOR PRODUCT
Filed April 5, 1960  2 Sheets-Sheet 1

INVENTOR.
F.T. SHERK
BY Hudson and Young
ATTORNEYS

United States Patent Office 3,073,877
Patented Jan. 15, 1963

3,073,877
DEFLUORINATION OF HF ALKYLATION
REACTOR PRODUCT
Fred T. Sherk, Bartlesville, Okla., assignor to Phillips Petroleum Company, a corporation of Delaware
Filed Apr. 5, 1960, Ser. No. 20,094
7 Claims. (Cl. 260—683.48)

This invention relates to the treatment of organic materials to remove therefrom fluorine-containing compounds. In one aspect this invention relates to an improved method for removing fluorine-containing compounds from the hydrocarbon products of a hydrocarbon conversion process wherein anhydrous HF is used as a conversion catalyst. In another aspect this invention is concerned with a combination of related and cooperative steps whereby the process of defluorination of the hydrocarbon is more completely and more efficiently performed.

In a process for the conversion of hydrocarbons wherein anhydrous hydrogen fluoride (HF) is employed as a catalyst there inevitably occur side reactions in addition to the desired conversion reaction. For example, hydrogen fluoride reacts with some of the hydrocarbons to form organic fluorides.

In a typical HF alkylation reaction, for example, the alkylation of isobutane with a butene to form isooctane, the reactor effluent is fractionally distilled to remove low-boiling hydrocarbons from the alkylate. In those instances where the low-boiling hydrocarbons are recycled to the process or utilized as fuel, the presence therein of organic fluorides poses no problem. However, in those instances wherein the low-boiling hydrocarbons are utilized as a product, it is often necessary that these hydrocarbons be substantially free from hydrogen fluoride or organic fluorides.

It is therefore a principal object of this invention to provide a method for removing fluorine-containing compounds from low-boiling hydrocarbons recovered from an HF alkylation process. It is also an object of this invention to provide a method for removing fluorine-containing compounds from products of HF alkylation and recovering resulting hydrogen fluoride for reuse in the process. Other objects and advantages will become apparent to one skilled in the art upon study of the disclosure, including the detailed description of the invention and the attached drawing wherein.

I have now discovered that organic fluorides can be substantially completely decomposed in a unitary process by a novel combination of integrated steps. Thus, according to this invention, a stream containing organic fluorides, e.g., the overhead product from a fractional distillation step following the alkylation reaction, can be condensed so as to form a liquid hydrocarbon phase and a liquid HF phase and a portion of the HF phase can be returned to the fractional distillation step to promote the decomposition of the organic fluorides. I have found that the organic fluorine-containing compounds which are present in the feed to a distillation step following an HF alkylation reaction can be decomposed in the distillation step in the presence of free HF. While the temperature conditions in the distillation column are usually sufficient to promote this decomposition reaction, I prefer to pass the liquid HF from the phase separation to the feed to the distillation step at a point upstream from the heater which is usually employed to raise the temperature of the feed to the distillation column to a temperature in the range of about 130 to about 175° F. In this manner, the organic fluorine-containing compounds in the feed are intimately contacted with the HF at an elevated temperature so that the decomposition reaction is accelerated. There is no limiting upper temperature and temperatures as high as 400 or 500° F., which sometimes are utilized in distillation operations, are applicable.

In an HF alkylation process wherein the first fractional distillation step is for the purpose of removing $C_3$ and lighter materials overhead, this overhead stream will sometimes contain about 1000 to about 1200 p.p.m. of fluorine in the form of fluorine-containing compounds such as alkyl fluorides. By utilization of this invention the fluorine-containing compound content of this stream will be reduced to about 200 to about 300 p.p.m. The fluoride content will also sometimes be as low as 200 to 300 p.p.m. and the reduction in fluoride content by practice of the invention will be proportionately as great as when the fluoride content is 1000 p.p.m. or greater. This reduction in fluorine-containing compounds is accomplished without changing the operating conditions of the alkylation process or of the fractional distillation steps which follow.

Figure 1:
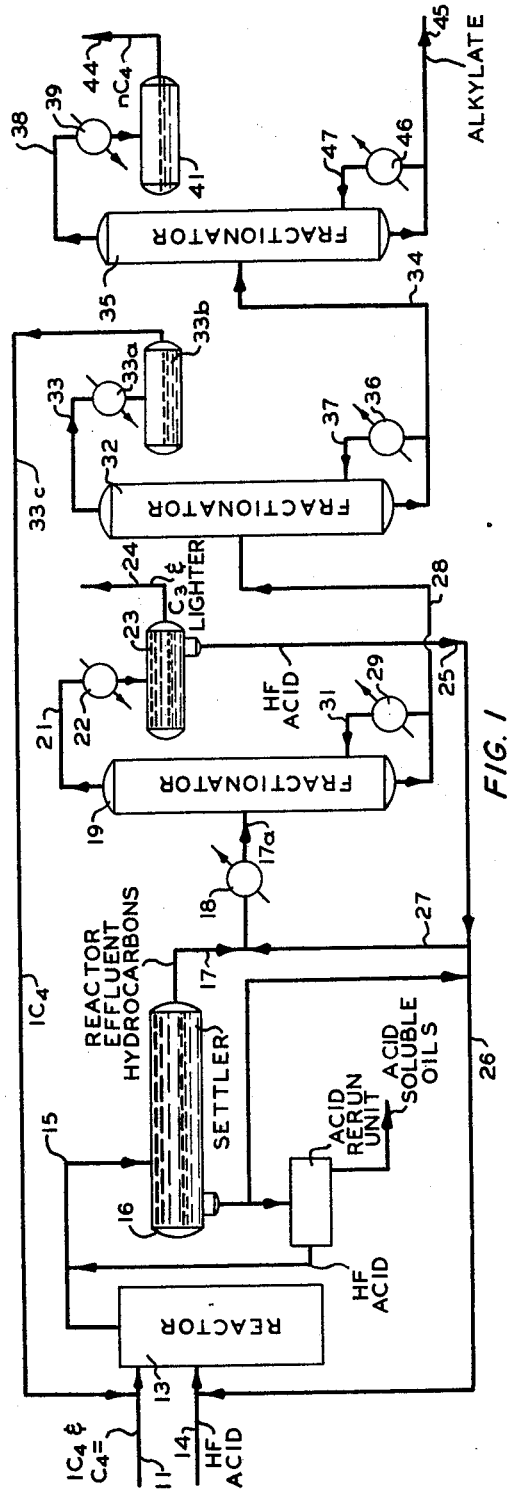
FIGURE 1 is a schematic flow sheet of an HF alkylation process having embodied therein the present invention.

In the embodiment of FIGURE 1, the alkylation reactants enter the system via conduit 11. These reactants comprise a paraffin hydrocarbon having at least one tertiary carbon atom per molecule and an alkylating agent such as an olefin. For sake of simplicity in this description various valves, pumps and other auxiliary equipment will not be illustrated but those skilled in the art will readily be able to supply these because the alkylation reaction is well known in the art. Also for the sake of simplicity, the reaction will be described as applied to isobutane and butylene although it is to be understood that the reaction is not limited thereto. These reactants pass into reactor 13 where they are intimately mixed with hydrofluoric acid which enters via conduit 14. The reactor effluent passes via conduit 15 to acid settler or separator 16 wherein the reaction effluent is separated into an upper hydrocarbon phase and a lower acid phase. The hydrocarbon phase is passed through conduit 17 and heater 18 to fractionator 19 wherein a fractional distillation removes propane and lighter products overhead via conduit 21 and condenser 22 to accumulator 23 wherein a phase separation occurs. The lighter hydrocarbon phase comprising propane and lighter materials is removed via conduit 24 and the heavier acid phase is removed via conduit 25 and passed via conduit 27 where it joins the reactor effluent hydrocarbons in conduit 17 and passes therewith through heater 18 into fractionator 19. Excess HF acid over that required for recycle to fractionator 19 continues through conduit 26 and joins the acid in conduit 14, passing therewith into reactor 13. The kettle product from fractionator 19 is removed via conduit 28, a portion being returned to fractionator 19 via reboiler 29 and conduit 31. The material in conduit 28 is passed to fractionator 32 wherein isobutane is separated by fractional distillation and passed overhead from fractionator 32 via conduit 33, condenser 33a, accumulator 33b and conduit 33c to conduit 11 to be returned to reactor 13 as recycle isobutane. The kettle product from fractionator 32 passes via conduit 34 to fractionator 35. A portion of the kettle product is returned to fractionator 32 via reboiler 36 and conduit 37. Normal butane is distilled from the materials in fractionator 35 and passes via conduit 38 and condenser 39 to accumulator 41. Normal butane is removed from accumulator 41 via conduit 44. Alkylate product is removed from fractionator 35 via conduit 45, a portion being returned via reboiler 46 and conduit 47 to fractionator 35.

Figure 2:
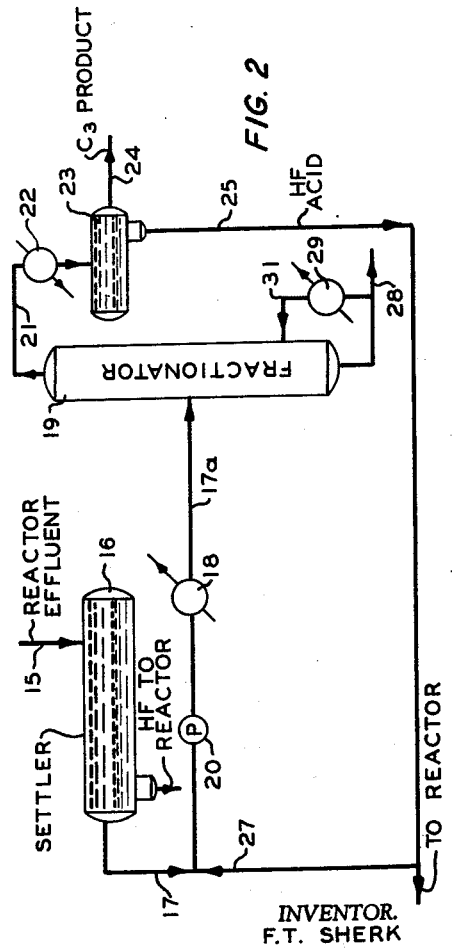
FIGURE 2 is a more detailed schematic flow sheet of the steps which comprise the invention.

Referring now to FIGURE 2 the reactor effluent passes to settler 16 via conduit 15 and a phase separation occurs in settler 16. Liquid HF is removed from the bottom of the settler. Liquid hydrocarbons are removed from the settler via conduit 17 and passed via pump 20, heater 18, and conduit 17a to fractionator 19 which is operated as a depropanizer, removing propane and lighter materials as overhead product via conduit 21 and condenser 22 to accumulator 23 wherein a phase separation occurs. Propane and lighter products are removed from the upper liquid layer via conduit 24 and liquid HF is removed from the lower liquid layer via conduit 25 and passed via conduit 27 to conduit 17 so as to be returned to fractionator 19. The kettle product comprising substantially fluorine-free isobutane and heavier hydrocarbons is passed via conduit 28 to further separation steps as indicated in FIGURE 1. The propane and lighter products are usually passed to an HF stripping step and a caustic soda wash step to remove residual HF. The HF removed can be recovered and returned to the alkylation reactor or otherwise utilized. Frequently the vapors from a stripping step containing propane and HF along with other materials if present are returned to conduit 21 and are fed to condenser 22 with the fractionator 19 overhead vapors. In such a case the HF phase removed from the accumulator 23 via conduit 25 contains all of the recovered free HF.

Typical operating conditions according to one installation of the invention are herewith described with reference to FIGURE 1, but it is to be understood that these operating conditions are exemplary and are not to be construed as unduly limiting the invention. Reactor 13 is operated at a temperature of 95° F. and 125 p.s.i.a. The acid rerun unit is operated to produce a liquid rerun acid containing some liquid isobutane and other hydrocarbons at a pressure and temperature similar to those given for the reactor. The hydrocarbon and acid materials are transported via conduit 15 to the settler 16 where phase separation occurs at 95° F. The temperature of the feed to fractionator 19 is raised to 150° F. and fractionator 19 is operated at a pressure of 315 p.s.i., a bottom temperature of 215° F. and a top temperature of 136° F. Accumulator 23 is operated at 115° F. and 305 p.s.i.a. Fractionator 32 is operated at a pressure of 180 p.s.i.a., a bottom temperature of 340° F. and a top temperature of 150° F. Fractionator 35 is operated at a pressure of 85 p.s.i.a., a bottom temperature of 315° F., and a top temperature of 135° F. It is to be understood that a portion of the hydrocarbon vapors condensed and collected in the accumulator of each fractionator is returned to the top of the fractionator as reflux according to conventional practice.

In one typical HF alkylation installation, operated according to prior art practices, the $C_3$ and lighter product stream recovered as the overhead product from the fractionator corresponding to fractionator 19 of FIGURE 1 contained from 1000 to 1200 p.p.m. of fluorine in the form of fluorine-containing organic compounds after an HF stripping step and a caustic soda wash. When this installation was modified so as to operate according to the present invention, and HF was added to the fractionator feed in an amount of about 2 volume per cent of the feed, the fluorine content of the $C_3$ and lighter stream recovered as overhead product from the fractionator corresponding to fractionator 19 of FIGURE 1 after the HF stripping step and caustic soda wash was reduced to from 200 to 300 p.p.m.

In the process illustrated in FIGURE 1, the first fractional distillation step is that of removing $C_3$ and lighter hydrocarbons overhead and isobutane is removed as the overhead product in the second fractional distillation step. In some installations the first fractional distillation step is a deisobutanizing step wherein the overhead product comprises isobutane as well as the $C_3$ and lighter hydrocarbons, and $C_3$ and lighter materials are removed overhead in a second fractional distillation step. In any event, the present invention is practiced on the first fractional distillation step and comprises condensing the fractionator overhead product, collecting the condensate in an accumulator wherein a phase separation occurs, and returning the acid phase, or at least a portion thereof, to the distillation step. In some installations, it may be desirable to divide the reactor effluent so that one portion passes to a depropanizer and a second portion passes to a deisobutanizer in which case fluorine compounds would be present in the feed to each distillation step and the invention could be practiced on each or either distillation step.

Figure 3:
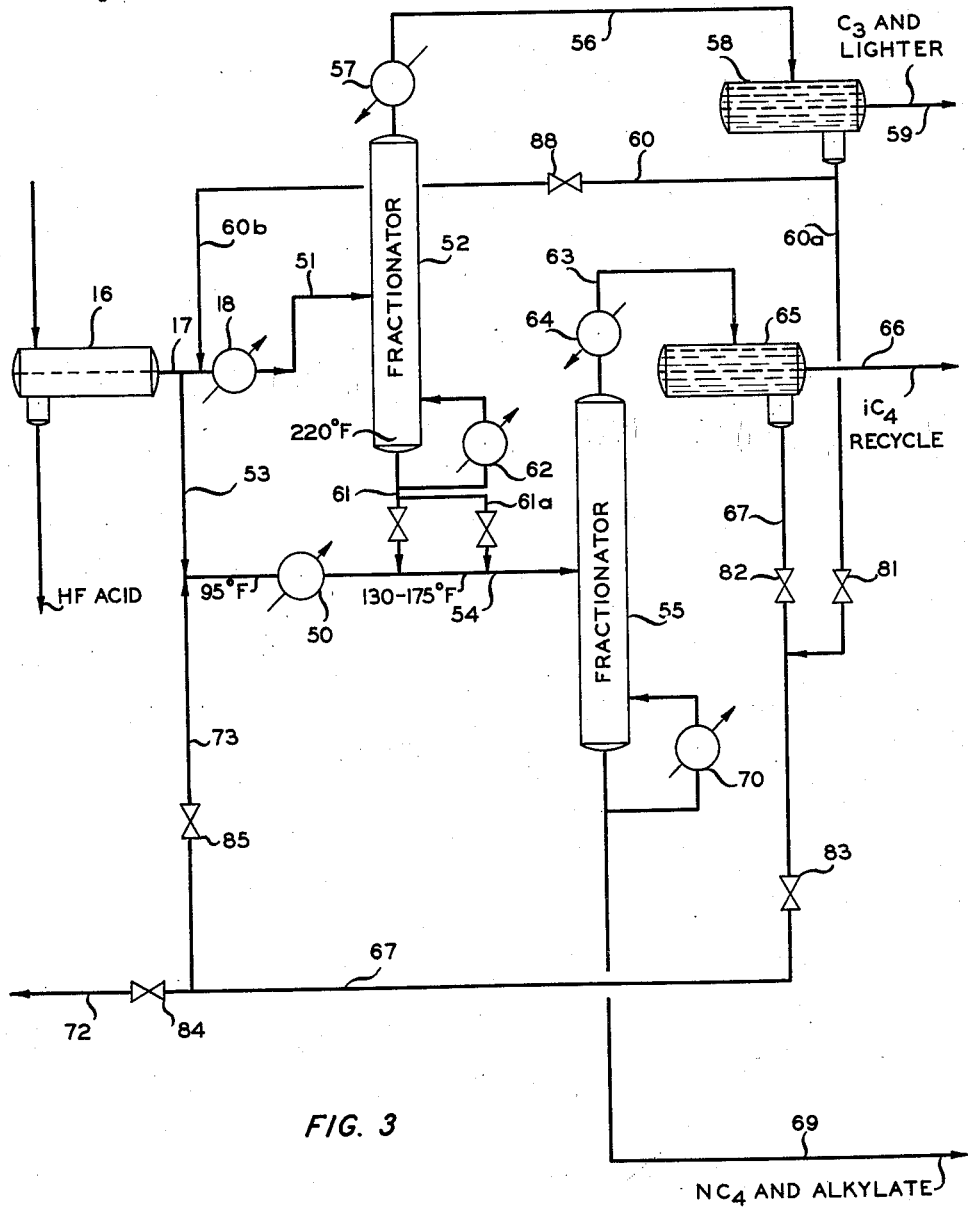
FIGURE 3 illustrates a modification of the invention.

FIGURE 3 illustrates a modification of the invention wherein the reactor effluent stream is divided between a depropanizer and a deisobutanizer. The stream in conduit 17 is divided so that a first portion of the stream passes via heater 18 and conduit 51 to depropanizer 52 and a second portion passes via conduits 53 and 54 to deisobutanizer 55. The overhead from depropanizer 52 passes via conduit 56 and condenser 57 to accumulator 58 where a phase separation occurs. Propane and lighter materials are removed via conduit 59. Liquid HF is removed from accumulator 58; the major portion is passed to conduit 17 via conduit 60, the remainder being passed to conduit 67 via conduit 60a. The kettle product from depropanizer 52 passes via conduit 61 to the feed conduit 54 of deisobutanizer 55. A portion of the depropanizer kettle product is diverted to reboiler 62 of depropanizer 52. If desired, a portion of the kettle product in conduit 61 can be diverted via conduit 61a. A heater 50 can be utilized in conduit 54 if desired.

The overhead product from deisobutanizer 55 passes via conduit 63 and condenser 64 to accumulator 65 where a phase separation occurs if the temperature is not too high. Isobutane recycle, containing some propane and normal butane, is removed via conduit 66 and recycled to the alkylation reactor. Liquid HF, if present, is removed via conduit 67 and is introduced into conduit 53 upstream from heater 50. The kettle product from deisobutanizer 55, comprising normal butane and alkylate, is passed via conduit 69 for further processing. A portion of this kettle product stream is diverted to reboiler 70 of deisobutanizer 55. The propane stream in conduit 59 and the alkylate stream in conduit 69 are substantially free of organic fluorides. The excess HF, over that required in fractionators 52 and 55, can be returned to the reactor via conduit 72.

The depropanizer kettle product in conduit 61 will usually be at a temperature of about 220° F. so that only a portion of this stream will be required to raise the temperature of the material in conduit 54 to the proper temperature, 130 to 175° F., and the remainder of this stream can be diverted to a point downstream, such as in conduit 61a. If desired, a heater such as heater 50 can be employed to raise the temperature of the material in conduit 54 and the kettle product can be utilized as the heat source. After the feed stream and the liquid HF have been in contact at a temperature in the range of 130–175° F. for a short time, the temperature can be raised to above this range.

With valves 81, 82, 83, 84, 85 and 88 open, the HF will flow through conduits 60a, 60b, 67, 72 and 73. With valves 82 and 84 closed and valves 81, 83, 85 and 88 open, HF will flow through conduits 60, 60a, 60b, 67 and 73.

If desired, HF can be introduced into conduit 17 only, so that the feed to deisobutanizer 55 will be only partly treated. The alkylate in line 69 will be reduced in fluorides less than if HF is introduced into conduit 53 as well as into conduit 17, but it may be economically desirable to operate in this manner.

I prefer to add the acid to the feed stream passing to the distillation step prior to the heating of that stream so that the HF is in intimate contact with the disillation feed stream at the elevated temperature prior to passing to the distillation step; however, the HF can be added to other points in the distillation step to obtain satisfactory reduction of fluorine content of the product in substantially all cases, so long as there is present an excess of liquid HF, over that required for saturation of the hydrocarbon, and an alkylatable hydrocarbon.

The amount of HF required in the feed to the distillation step is quite small, usually less than about 5 volume percent of the feed stream, regardless of the amount of fluorides present in the stream. Preferably HF is added in an amount of about 1 to about 2 volume percent over the amount required to saturate the hydrocarbon at the conditions of temperature and pressure at the contacting of the HF and hydrocarbon, although as much as 5 volume percent or more can be added.

Although the invention has been described as applied to the alkylation of a paraffin hydrocarbon, it is not to be construed as being limited to the alkylation of paraffin hydrocarbons but is equally applicable to the decomposition of alkyl fluorides derived from the alkylation of any alkylatable hydrocarbon such as aromatic hydrocarbons, e.g., benzene, and the like.

Reasonable variations and modifications are possible within the scope of this disclosure without departing from the spirit and scope of the invention.

That which is claimed is:

1. In the process of alkylating an alkylatable hydrocarbon with an alkylating agent in the presence of a hydrofluoric acid catalyst wherein the alkylation reaction effluent separated from the hydrofluoric acid catalyst and consisting essentially of hydrocarbons, containing organic fluorine compounds, is fractionally distilled stepwise to remove propane and lighter compounds in one step and to remove normal butane therefrom in another step, the improvement comprising condensing the overhead products from the first distillation step; collecting the condensate so as to form a liquid hydrocarbon phase and a liquid hydrofluoric acid phase; removing the hydrocarbon phase of reduced organic fluorine compound content; adding a stream consisting essentially of said hydrofluoric acid phase to the feed to the first distillation step; heating the feed consisting essentially of liquid hydrofluoric acid and alkylation reaction effluent hydrocarbons; and passing said heated mixture to said first distillation step.

2. In the process of alkylating a paraffin with an alkylating agent in the presence of a hydrofluoric acid catalyst wherein the reaction product, separated from the hydrofluoric acid catalyst and consisting essentially of organic fluorine compounds along with other hydrocarbons, is passed to a series of fractional distillation steps to recover alkylate and hydrocarbons lighter than alkylate, the improvement comprising condensing the overhead product from the first fractional distillation step; collecting the condensate so as to form a liquid hydrocarbon phase and a liquid hydrofluoric acid phase; removing the hydrocarbon phase of reduced organic fluorine compound content; removing the liquid hydrofluoric acid phase; passing at least a portion of the liquid hydrofluoric acid phase into contact with the reaction product containing organic fluorine compounds; heating the resulting combined stream consisting essentially of liquid hydrofluoric acid and the reaction product to a temperature in the range of about 130 to 175° F.; passing the heated stream, as the sole feed, to said first fractional distillation step; and passing the kettle product from said first fractional distillation step to subsequent fractional distillation steps.

3. In the process of alkylating a paraffin with an alkylating agent in the presence of a hydrofluoric acid catalyst wherein the reaction product containing the alkylate so produced, organic fluorine compounds and hydrocarbons lighter than the alkylate, is passed to a fractional distillation step, the improvement comprising condensing the overhead product from said fractional distillation; collecting the condensate so as to form a liquid hydrocarbon phase and a liquid hydrofluoric acid phase; removing and recovering the hydrocarbon phase of reduced organic fluorine compounds content; removing the hydrofluoric acid phase; admixing at least about 0.5 volume percent, based on hydrocarbon, of said liquid acid with the reaction product passing to said distillation; passing remaining acid removed from said collecting step to the process of alkylating; heating the mixture consisting essentially of acid and reaction product to a temperature in the range of about 130 to about 175° F.; passing the heated mixture as the sole feed to said fractional distillation step; and recovering the kettle product from said fractional distillation step.

4. The process of claim 3 wherein the alkylate and hydrocarbons are passed to a depropanizing distillation step.

5. The process of claim 3 wherein the alkylate and hydrocarbons are passed to a deisobutanizing distillation step.

6. The process of claim 3 wherein the alkylate and hydrocarbons are divided into two streams the first of which is passed to a depropanizing distillation step and the second of which is passed to a deisobutanizing distillation step.

7. A process for removing organic fluorine-containing compounds from a hydrocarbon material containing same which comprises:
  (1) passing a hydrocarbon material containing a minor quantity of an organic fluorine-containing compound to a distillation step;
  (2) condensing the overhead product from said distillation step to form a liquid HF phase and a liquid hydrocarbon phase;
  (3) recovering the liquid hydrocarbon phase as overhead product of reduced organic fluorine-containing compound content;
  (4) passing liquid HF from said liquid HF phase to the hydrocarbon material feed to the distillation step in an amount sufficient to maintain an excess of liquid HF over that required to saturate the hydrocarbon material passing to said distillation step and heating the mixture consisting essentially of liquid HF and hydrocarbon material to a temperature in the range of about 130 to 175° F. prior to passage to said distillation step.

References Cited in the file of this patent

UNITED STATES PATENTS

| | | |
|---|---|---|
| 2,372,338 | Penisten | Mar. 27, 1945 |
| 2,448,092 | Gibson | Aug. 31, 1948 |
| 2,463,077 | Zimmerman et al. | Mar. 1, 1949 |
| 2,636,912 | Leatherman | Apr. 28, 1953 |
| 2,984,693 | Cabbage | May 16, 1961 |